United States Patent
Spangemacher et al.

(10) Patent No.: US 10,382,965 B2
(45) Date of Patent: Aug. 13, 2019

(54) IDENTITY VERIFICATION USING COMPUTER-IMPLEMENTED DECENTRALIZED LEDGER

(71) Applicant: SAP SE, Walldorf (DE)

(72) Inventors: Thomas Spangemacher, Neulußheim (DE); Alexander Gehres, Ketsch (DE)

(73) Assignee: SAP SE, Walldorf (DE)

( * ) Notice: Subject to any disclaimer, the term of this patent is extended or adjusted under 35 U.S.C. 154(b) by 217 days.

(21) Appl. No.: 15/608,839

(22) Filed: May 30, 2017

(65) Prior Publication Data

US 2018/0351747 A1 Dec. 6, 2018

(51) Int. Cl.
*H04W 12/08* (2009.01)
*G06F 21/31* (2013.01)
*H04L 29/06* (2006.01)
*H04L 9/32* (2006.01)

(52) U.S. Cl.
CPC ............ *H04W 12/08* (2013.01); *G06F 21/31* (2013.01); *H04L 9/3239* (2013.01); *H04L 63/08* (2013.01); *H04L 63/126* (2013.01); *G06F 2221/2103* (2013.01); *H04L 9/3247* (2013.01); *H04L 2209/38* (2013.01)

(58) Field of Classification Search
CPC .................................................... H04L 9/3242
See application file for complete search history.

(56) References Cited

U.S. PATENT DOCUMENTS

| | | | | |
|---|---|---|---|---|
| 9,635,000 | B1* | 4/2017 | Muftic | H04L 63/0435 |
| 10,158,480 | B1* | 12/2018 | Winklevoss | H04L 9/0825 |
| 2015/0356523 | A1* | 12/2015 | Madden | G06Q 20/065 |
| | | | | 705/76 |
| 2016/0260169 | A1* | 9/2016 | Arnold | G06Q 40/12 |
| 2016/0283920 | A1* | 9/2016 | Fisher | H04L 9/3239 |
| 2017/0048216 | A1* | 2/2017 | Chow | G06Q 20/0655 |
| 2017/0243193 | A1* | 8/2017 | Manian | G06Q 20/3829 |
| 2017/0250972 | A1* | 8/2017 | Ronda | H04L 9/08 |
| 2018/0115538 | A1* | 4/2018 | Blake | H04L 63/10 |

* cited by examiner

*Primary Examiner* — Simon P Kanaan
(74) *Attorney, Agent, or Firm* — Jones Day

(57) ABSTRACT

An identity verification application receives data encapsulating a request to verify an identity of a user that includes user-provided identification data. Thereafter, the identity verification application then hashes the user-provided data and traverses a decentralized ledger including a data structure comprising a plurality of linked segments to identify a match of the hash of the user-provided identification data. The identity verification application then provides verification data that either (i) confirms the identity of the user if the hash of the user-provided identification data has a match in the decentralized ledger, or (ii) rejects the identity of the user if the hash of the user-provided identification data does not have a match in the decentralized ledger. Related apparatus, systems, techniques and articles are also described.

20 Claims, 7 Drawing Sheets

IDENTITY VERIFICATION USING COMPUTER-IMPLEMENTED DECENTRALIZED LEDGER

TECHNICAL FIELD

The subject matter described herein relates to a computer-based decentralized ledger such as blockchain that can be used to securely verify user identities.

BACKGROUND

User identities are becoming increasingly difficult to confirm as sensitive personal information is becoming increasingly exposed to malicious parties through hacks and other unauthorized access to computer systems and networks storing or transporting such information. Using both illegally obtained informant and publicly available information, malicious parties are able to impersonate other people often to their financial benefit through fraudulent transactions.

SUMMARY

In a first aspect, an identity verification application receives data encapsulating a request to verify an identity of a user that includes user-provided identification data. Thereafter, the identity verification application then hashes the user-provided data and traverses a decentralized ledger including a data structure comprising a plurality of linked segments to identify a match of the hash of the user-provided identification data. The identity verification application then provides verification data that either (i) confirms the identity of the user if the hash of the user-provided identification data has a match in the decentralized ledger, or (ii) rejects the identity of the user if the hash of the user-provided identification data does not have a match in the decentralized ledger.

Each segment can include an acknowledgement of such hash of identification information. With such variations, it can be determined whether the corresponding acknowledgement is from a pre-approved entity. The acknowledgement of the hash can be a cryptographic signing of the hash in the segment.

The hash of identification information can include a hash of concatenated user information.

The hash of identification information can include a concatenation of multiple hashes of user information.

The hash of identification information can be generated by the user signing a hash of user information using a private key. With such arrangement, the user-provided information can be signed by the private key.

The provision of verification data can include one or more of: displaying at least a portion of the verification data, transmitting at least a portion of the verification data, storing at least a portion of the verification data into electronic physical persistence, or loading at least a portion of the verification data into memory.

Non-transitory computer program products (i.e., physically embodied computer program products) are also described that store instructions, which when executed by one or more data processors of one or more computing systems, cause at least one data processor to perform operations herein. Similarly, computer systems are also described that can include one or more data processors and memory coupled to the one or more data processors. The memory can temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter enables the verification of sensitive personal data in a public and distributed system without exposing such data (but rather only by exposing a hash of such data). Such an arrangement enables an owner of the sensitive personal data to decide whom to trust and give access to some or all of such sensitive personal data.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
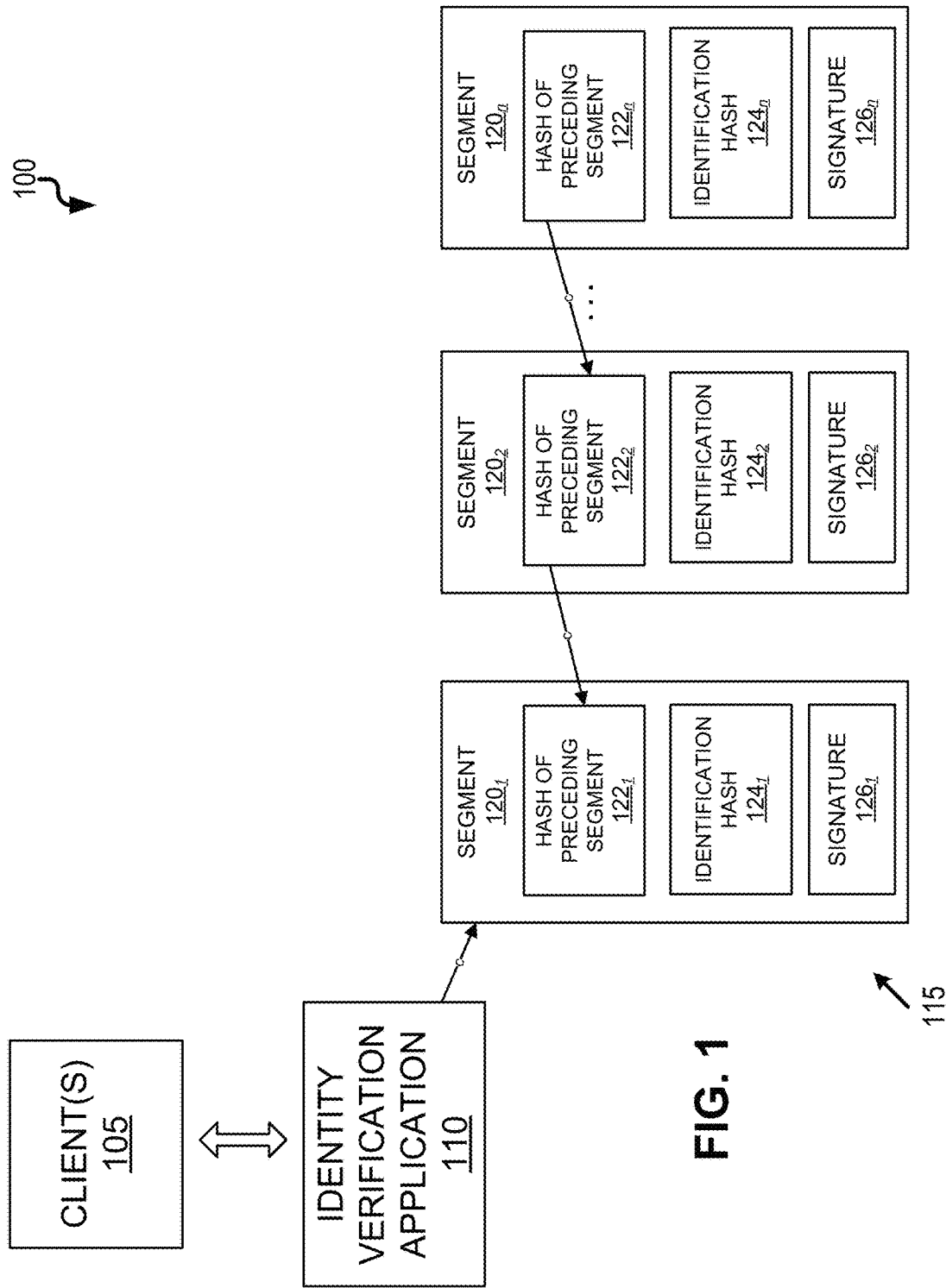
FIG. 1 is a system diagram illustrating a decentralized ledger for user identification.

The current subject matter is directed to systems, apparatus, methods and computer program products for verifying user identity using a decentralized ledger or blockchain. Decentralized ledgers or blockchains as provided herein can save data publicly on a decentralized database (as illustrated in FIG. 1), which cannot be erased. Many computing nodes in a network (which can be vast and include thousands of nodes, etc.) can be used to store this data in a decentralized manner and cryptographic algorithms can provide that the data cannot be changed unknowingly.

Cryptographic hash functions take any data as input and convert it to a fixed-sized string as output, the "hash". Cryptographic hash functions are one-way functions, that means it is not possible to retrieve the input data from the output data—actually that means the input data is lost. However, the same input data will always result in the same hash, making cryptographic hashes useful for comparing or validating data. A very small change of the input data results in a complete different output hash. Therefore, cryptographic hash functions are often used as checksums for digital data transfer because hashes (even of big documents) can quickly be generated and submitted to test if the file transfer fast successful.

There are two primary attack vectors of cryptographic hashes. The first attack vector is the fact, that collisions can occur. When two or more different input values result in the same hash, it is called a collision and this might lead to wrong conclusions. For example, that two different documents are treated as the same document, or with the password example that two different passwords are allowed to log in.

Another attack vector is to get the input data via brute force in that an attacker can guess and hash input values as long as the correct hash was found. This type of attack is often done if a database with hashed passwords is leaked. The protection against this attack vector is to "salt" the hash, meaning before hashing the input data is changed in a standard way, for example a certain keyword is appended to the data. This dramatically increases the time for an attacker to retrieve the input data out of the hash.

When saving data to a decentralized ledger, one must assure that the data cannot be accessed or read by third-parties which should not have access to the data. For example, names, addresses or phone numbers should never be publicly available. There are two ways of ensuring this: encrypting the private data and sending the key only to those who should have access, or hashing the data, making it nearly impossible to use the actual data.

However, one must ensure that the data is secure for years to come, as the decentralized ledger can be publicly available to everyone, i.e. everybody has access to it and can read the data. Even with the computing power in 10, 25 or 50 years from now, the private data used as a source must not be accessible.

As used herein, a verifier is an entity which verifies private data of users. For example, a user can go to a verifier and let his postal address be verified. The verifier then certifies that the address of the user is correct (by looking at his or her physical identification (ID), visiting him or her at home, etc).

As used herein, a validator is any entity which wants to validate the correctness of private data. A validator trusts verifiers, to correctly verify the private data of users. Therefore, a trust-relationship between the validator and verifier is required.

FIG. 1 is a diagram 100 in which client(s) 105 can access or otherwise interface (i.e., via a directed connection, via a communications network, etc.) with an identity verification application 110. The client 105 and the identity verification application 110 can each be computing devices each having memory and one or more processors for executing instructions loaded in the memory. The identity verification application 110 can confirm a user identity by accessing a decentralized ledger 115 that includes a decentralized data structure (tangibly embodied in a database and/or cloud storage, etc.) having a plurality of linked segments $120_{1 \ldots n}$ forming part of an append only log structure maintained by a plurality of nodes within a computing network. Each segment can contain information about multiple users. For example, the complete identification/validation of a user can be split across several segments depending on the order the information is written to such decentralized ledger 115. For example, address changes can be added in newer segments $120_{1 \ldots n}$ as compared to name verifications and the like. In some variations, the identity verification application 110 can be a software application executing on the client 105 or an intermediary computing device.

As will be described in further detail below, each segment $120_{1 \ldots n}$ of the decentralized ledger 115 can be a data structure having a hash of preceding segment field $122_{1 \ldots n}$ (which is used to link the segments $120_{1 \ldots n}$ within the decentralized ledger 115), multiple identification hashes $124_{1 \ldots n}$ and a signature field $126_{1 \ldots n}$.

With the current subject matter, the private data of a user is hashed and saved into the decentralized ledger 115 in the identification hash field $124_{1 \ldots n}$ of a segment $120_{1 \ldots n}$ corresponding to such user. The identification hash $124_{1 \ldots n}$ can, for example, be a hash of a property of a user (e.g. street, housenumber, city, zip code) in which each element is hashed separately or such elements are combined to form one identification hash (e.g. address). With the former, the identification hash field $124_{1 \ldots n}$ can include multiple hashes. Alternatively, each segment $120_{1 \ldots n}$ can include multiple different identification hash fields (and such multiple fields can be used for identity verification purposes in parallel or separately).

The user verifies his or her identification hash at specific verifiers—showing proof that the private data is valid, e.g. by showing the ID. The verifier then acknowledges the identification hash, for example by cryptographically signing it. This acknowledgement is also saved in the decentralized ledger 115 in the signature field $126_{1 \ldots n}$. In some cases, there can be multiple signature fields which each correspond to a different verifying entity. Further, in some cases, there can be signatures for a particular hash saved across multiple segments $120_{1 \ldots n}$. For example, an individual can go to a post office to verify a ten year old address hash and then provides an update (via, for example, a timestamp) indicating that the address is still accurate and such verification can be saved in a different segment $120_{1 \ldots n}$.

Validators can now validate the private user-provided data by hashing it with the same algorithm used to generate the identification hash $124_{1 \ldots n}$. Such hashing can be performed, for example, on the client 105, by the identity verification application 110 or on a different computing device. In particular, the validators, via a client 105, can access the identity verification application to, in turn, traverse the decentralized ledger 115. Differences in the hashes indicate that the identification of the user cannot be confirmed (i.e., the identity validation request is rejected, etc.). In some cases, multiple validations can be performed if there are multiple hashes for comparison. Further, the client 105 and/or the identity verification application 110 can take into account the signature field $126_{1 \ldots n}$ and whether such signature is by/from a trusted verifier.

Various types of hashing algorithms can be used to save the data within the decentralized ledger 115. Desirable attributes include, for example, the algorithm making it as difficult as possible to find out the corresponding source data which was used to create the hash. Further, the hashing algorithm should prevent situations in which two or more different inputs create the same hash as such collisions can increase the chance of stealing a digital identity or validating wrong data. Further, both verifiers and validators needs to create the hash by their own, meaning that the algorithm must be made public. Otherwise, verifiers would not be able to verify that the hash is really the output of the validated source data and validators cannot trust the verification.

Some of the above criteria are already handled by various cryptographic hashing algorithms. SHA3 for example is regarded as a very proven and strong cryptographic hash function—its hashes are very hard to foresee or break and are usually free of collisions. When using SHA3 however, you still have to cope how to save the data against brute-forcing attacks (e.g. salts) and how to check if the data is valid.

One hashing algorithm that can be used is a concatenation of various (semi-)private data-sets of the user. The order or possible separation-logics are irrelevant because the algorithm is public and everybody has access to it. However, the information what is in the hash is not public and therefore increases or decreases security, depending which set of information is in the hash or not.

The (semi-)private data-sets can, for example, be the street of a user. The data therefore would be:

TABLE 1

| Property | Examples | Specific Example in this Document |
| --- | --- | --- |
| Unique ID/Account of the User | E.g. Passport numbers, domain names or e-mail addresses | User8392 |
| Name of the attribute | E.g. Name, Street, City, Phone Number | Street |
| Value of the attribute (this data should never be publicly read) | E.g. "Hugo Becker", "Dietmar-Hopp-Allee" or "Walldorf" | Dietmar-Hopp-Allee |
| Randomly generated or user-specified salt, which is a (semi-)private token only shared for verifying/validating the private information | E.g. "A9knL", "MyStreet", "_Xf03" | A9knL |

A technical representation of this could be the simple concatenation of values, e.g. "User8392SteetDietmar-Hopp-AleeA9knL". The resulting hash would be "0x9af3aflaec3b5fb02d32ff6667bf483fc939457e615ede23d a46bd1a44e779a4".

It could also be a concatenated with a separation character, e.g. "User8392_Street_Dietmar-Hopp-Allee_A9knL" with a hash of "0x718cee43f33db10425f2683156f0dc20 509c99177d4a933489fdadf39ae11b55".

Another technical representation can be to use a standardized JSON format {"id":"User8392", "Name":"Street", "Value":"Dietmar-Hopp-Allee", "Salt":"A9knL"} and a resulting hash of "0xd610612a2d831b008a6b19d77062 f0160159ce4a9e180aab72c9eaf26f58eele".

By using the ID, the name and value of the private data attribute and a randomly generated salt, the security of the hash is hardened, so that it is nearly impossible to extract the underlying private data (i.e. the value of the property) out of the hash. Therefore, the resulting hash could be securely saved in the public decentralized ledger.

In another variation, the (semi-)private user-provided data-sets could for example be the street of a user. The data therefore would be:

TABLE 2

| Property | Examples/Description | Specific Example in this Document |
| --- | --- | --- |
| Public Key of the User | The public key of the used asymmetric encryption algorithm | 0x9c1d2f25dc2c98408ff4 5b5b0c2118fc8eaf0d34ef e682a1c74ea2e3ab2f5e98 aad2a9139514e6cfb8b379 c1c217198f7ca435f183bd 7997fc38dc8ba365efc5 |
| Name of the attribute | E.g. Name, Street, City, Phone Number | Street |
| Value of the attribute (this data should never be publicly read) | E.g. "Hugo Becker", "Dietmar-Hopp-Allee" or "Walldorf" | Dietmar-Hopp-Allee |
| Signature of the concatenated public key, name and value of the attribute | With the private key the values are signed and thus act as a salt for the hash: signature := signWithPrivateKey(publicKey + name + value, privateKey) | 0xcb750e938866a145afdf 8574b97a06dd64b4ccb606 c68b3decf08b56553167d6 63420ab6da6e822cc52ab4 aef4427fc5802df7b2ac03 0b609704be5dcb930583 |

A technical representation of this could be the simple concatenation of values, e.g. "0x9cld2f25dc2 c98408ff45b5b0c2118fc8eaf0d34efe682a1c74ea2e3ab2f5e9 8aad2a9139 514e6cfb8b379c1c217198f7ca435f183bd7997 fc38dc8ba365efc5StreetDietmar-Hopp-Allee0xcb750e93 8866a145afdf574b97a06dd64b4ccb606c68b3decf08b56553 167d663420ab6da6e822cc52ab4aef4427fc5802df7b2ac030 b609704be5dcb930583". The resulting hash would be "0xef343866c1aeab506d0bb78076aff5f1c26ba9370488fe51 1bad16366c9228b0" with the SHA3 algorithm.

It could also be a concatenated with a separation character, like underscores or commas.

A better technical representation would be to use a standardized JSON format {"Publickey":" 0x9c1d2f25dc2c98408ff45b5b0c2118fc8eaf0d34efe682a1 c74ea2e3ab2f5e98aad2a9139514e6cfb8b379c1c2 17198f7ca435f183bd7997fc38dc8ba365efc5", "Name": "Street", "Value":"Dietmar-Hopp-Allee", "Signature":" 0xcb750e938866a145afdf8574b97a06dd64b4ccb606c68b3 decf08b56553167d663420ab6da6e822cc52ab4aef4427fc58 02df7b2ac030b609704be5dcb930583"} and a resulting SHA3 hash of "0x5ad68892135fe6583c1f78ab74d 80dac57940b 6ae4ac0189a6daa7e21e0029b3".

By using the public key, the name and value of the private data attribute and the signature of all three properties, the security of the hash is hardened, so that it is nearly impossible to extract the underlying private data (i.e. the value of the property) out of the hash. Therefore, the resulting hash could be securely saved in the public decentralized ledger 115.

Figure 2:
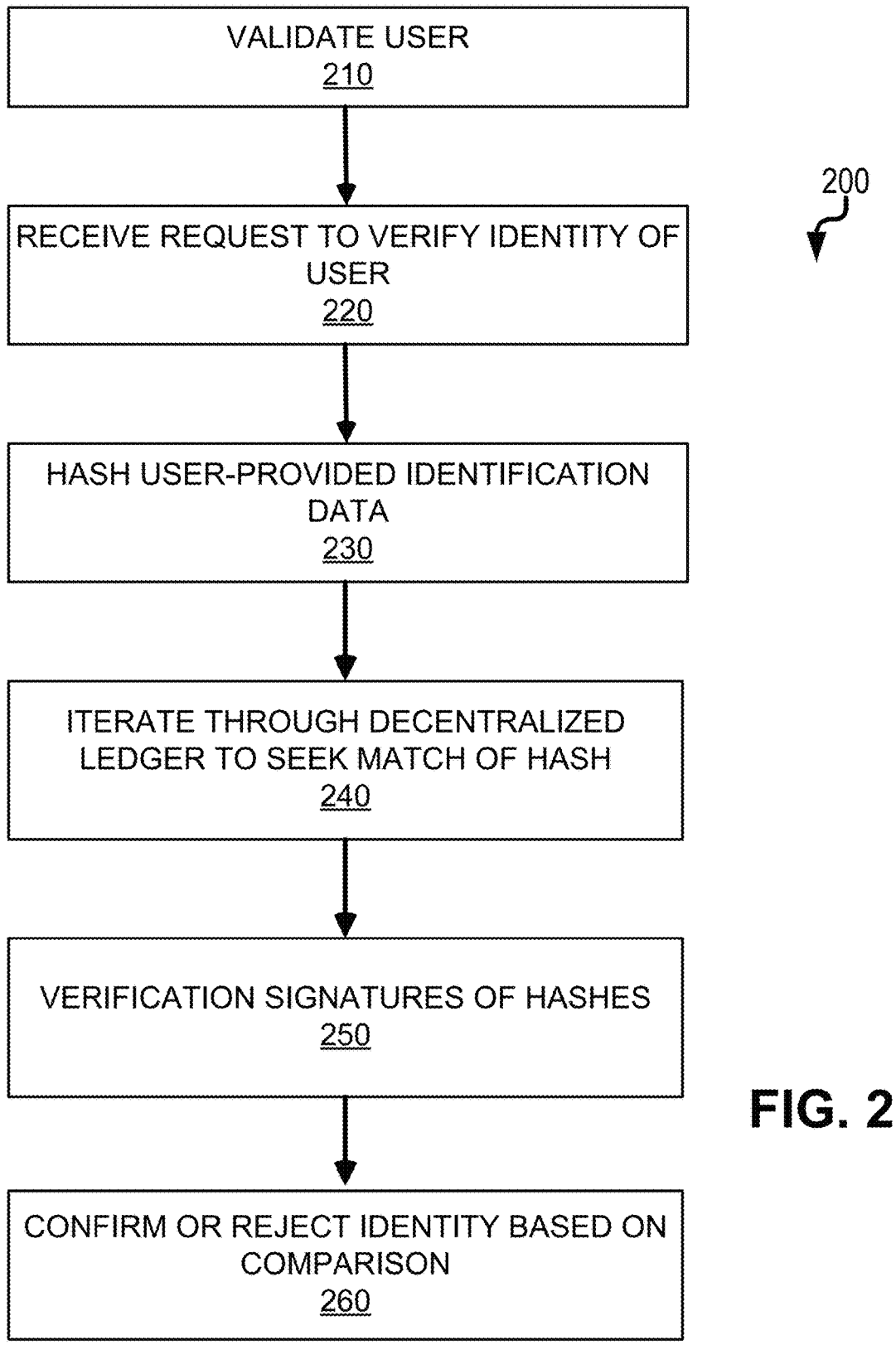
FIG. 2 is a process flow diagram illustrating user identify verification using a decentralized ledger.

FIG. 2 is a process flow diagram 200 in which, at 210, user validation is initiated. This validation can include, for example, a receiving party sending a random string which the requestor needs to sign with its private key. Thus, the receiving party is certain that the requestor actually owns the private key and with that, owns the identity. Otherwise, an entity that knows the signature which was used to create the hash could act as the identity, although it is not owning the identity. Thereafter, at 220, an identification verification application receives data encapsulating a request to validate an identify of a user. In some variations, the request can include user-provided identification data. In addition, at 230, the identity verification application hashes the user-provided identification data. Later, at 240, the identity verification application iteratively compares the hash of the user-provided identification data with the hashes in a decentralized ledger comprising a plurality of linked segments. In some cases, at 250, identify verification application can check the verifications of the hash (namely that such signatures are valid and do not match public keys of the verifying entity, etc.). Based on such comparison, at 260, the identity verification application provides verification data either (i) confirming the identity of the user if the hash of the user-provided identification data has a match in the decentralized ledger, or (ii) rejecting the identity of the user if the hash of the user-provided identification data does not have a match in the decentralized ledger. The provision of the verification data can include one or more of: displaying the verification data, transmitting the verification data to a remote computer node, storing the verification data in electronic storage persistence, or loading the verification data into memory.

Figure 3:
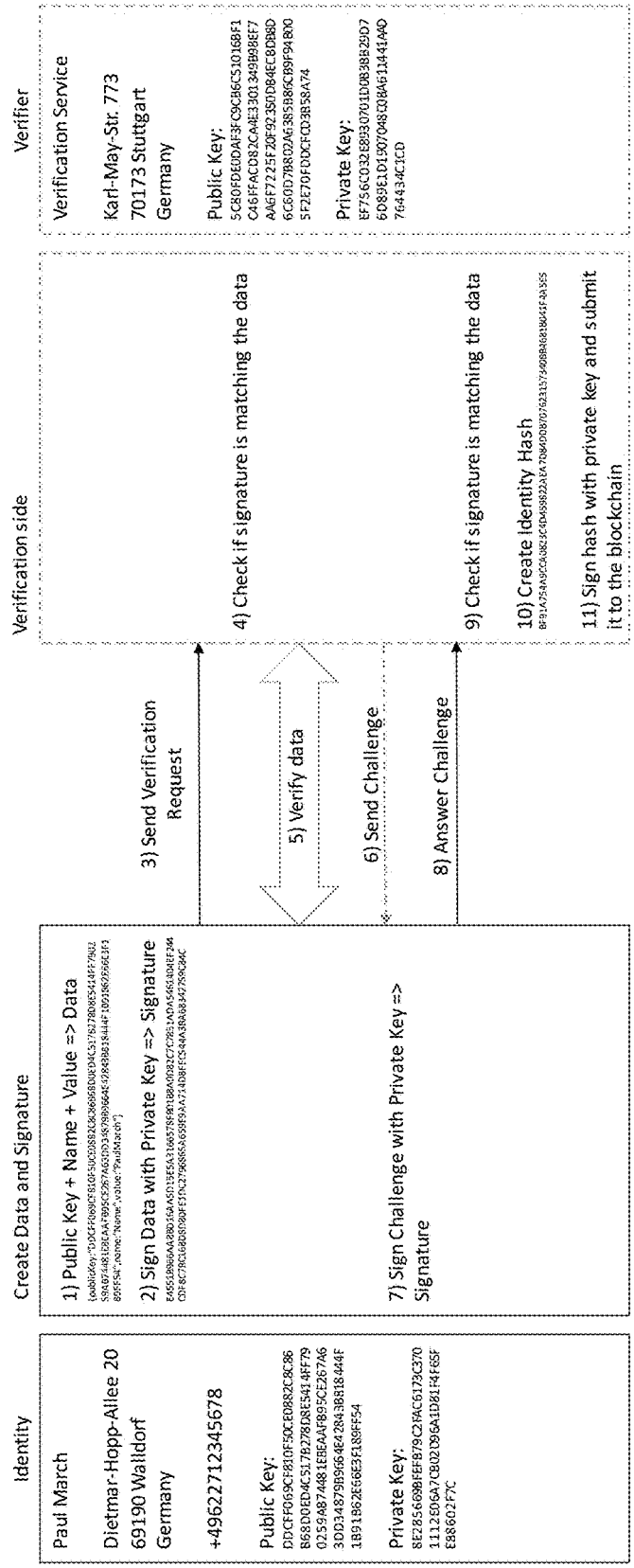
FIG. 3 is a diagram illustrating an example verification process.

FIG. 3 is a diagram 300 illustrating an example verification process. I this diagram 300, an identity hash can be a hash of at least one attribute or role of an identity comprising: 1) public key, 2) name of the attribute/role, 3) value of the attribute/role, 4) signature of publickey+name+value.

Verification of the hash can be verification of a specific identity hash comprising: 1) the identity hash, 2) the signature of the identity hash, signed with the private key of the verifier, 3) the public key of the verifier, 4) (optional) more information about the verifier, e.g. homepage, etc.

The verification request can, for example, be: {publicKey: "DDCFF069CF810F50CE0882C8C86B68D0ED4C517B278D8E5414FF790259AB74481E8EAAFB95CE267A63DD34879B9664E42843B818444F1B91B62E66E3F189FF54",name:"Name",value:"Paul March", signature:"E4551B966AA8BD16AA5D15E5A31666578FB01B8A0D82C7C7851ADA5461404EF244CDF8C7BC168D8D80FE1DC2796865A659E9AA714D8FEC544A3BA68342759C84C"}

Verify data can include a physical ID check, sending a verification SMS to a pre-determined phone number, sending a verification e-mail to a pre-determined e-mail address, and the like.

A random string can be sent to the identity and an up-to-date signature can be requested (to check if the private and public key are matching and that the identity owns the private key.

An example is: SHA256({publicKey: "DDCFF069CF810F50CE0882C8C86B68D0ED4C517B278D8E5414FF790259AB74481E8EAAFB95CE267A63DD34879B9664E42843B818444F1B91B62E66E3F189FF54",name:"Name",value:"Paul March", signature:"E4551B966AA8BD16AA5D15E5A3166578FB01B8A0D82C7C7851ADA5461404EF244CDF8C7BC168D8D80FE1DC2796865A659E9AA714D8FEC544A3BA68342759C84C"})=>BF91A754A9CCA0823C4D459822AEA7D84DDB707623157340BB4681B041F4A5E5

Figure 4:
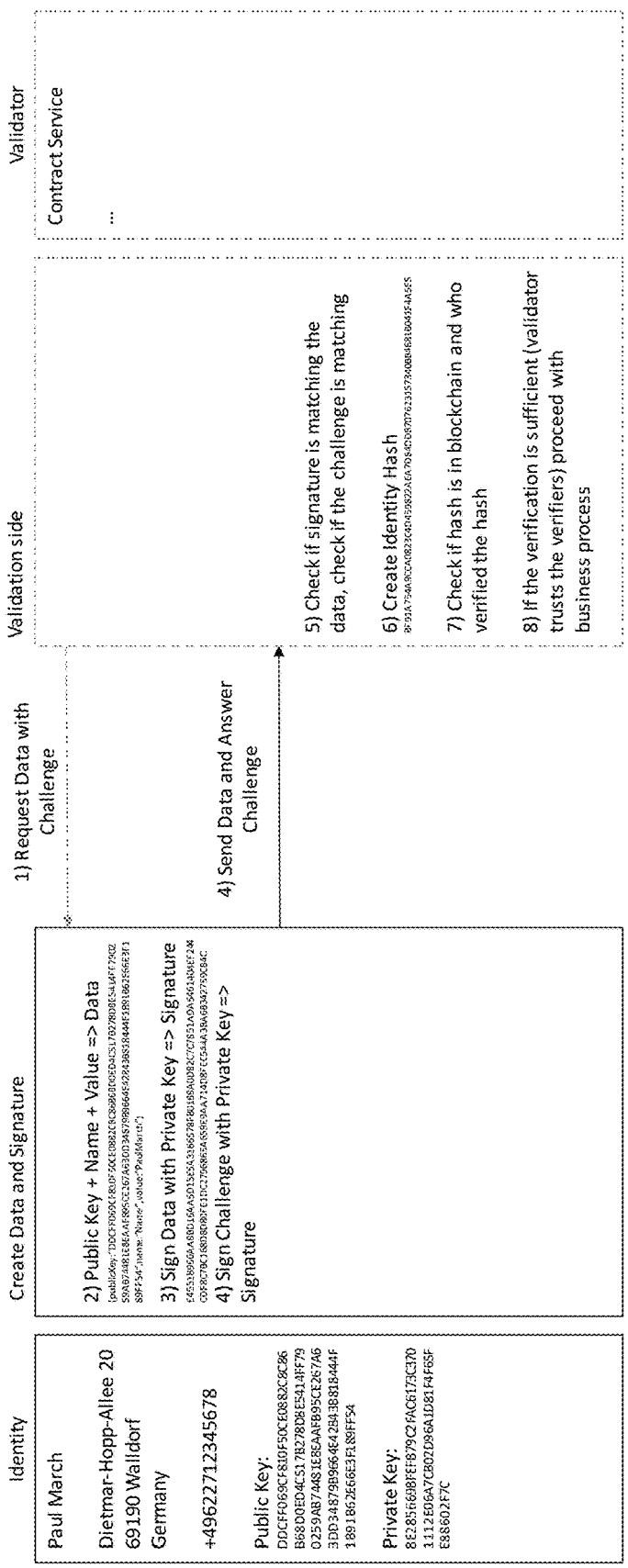
FIG. 4 is a diagram illustrating an example validation process.

FIG. 4 is a diagram illustrating an example validation process in which data is requested with a challenge. With this arrangement, data and a signature are created such as: Public Key+Name+Value=>Data {publicKey: "DDCFF069CF810F50CE0882C8C86B68D0ED4C517B278D8E5414FF790259AB74481E8EAAFB95CE267A63DD34879B9664E42843B818444F1B91B62E66E3F189FF54",name:"Name",value:"PaulMarch"}. This is followed by: signing data with Private Key=>Signature E4551B966AA8BD16AA5D15E5A3166578FB01B8A0D82C7C7851ADA5461404EF244CDF8C7BC168D8D80FE1DC2796865A659E9AA714D8FEC544A3BA68342759C84C with the challenge then be signed with a private key.

The data and the answer to the challenge are then sent to the validator. The validator then checks if the signature matches the data and checks if the challenge is matching. An identity hash is then created such as:
BF91A754A9CCA0823C4D459822AEA7D84DDB707623157340BB 4681B041F4A5E5

It is then checked to see if the hash is in the blockchain and who verified the hash. If the verification is sufficient (the validator trusts the verifiers), then an indication is provided that authenticates/validates the entity.

Figure 5:
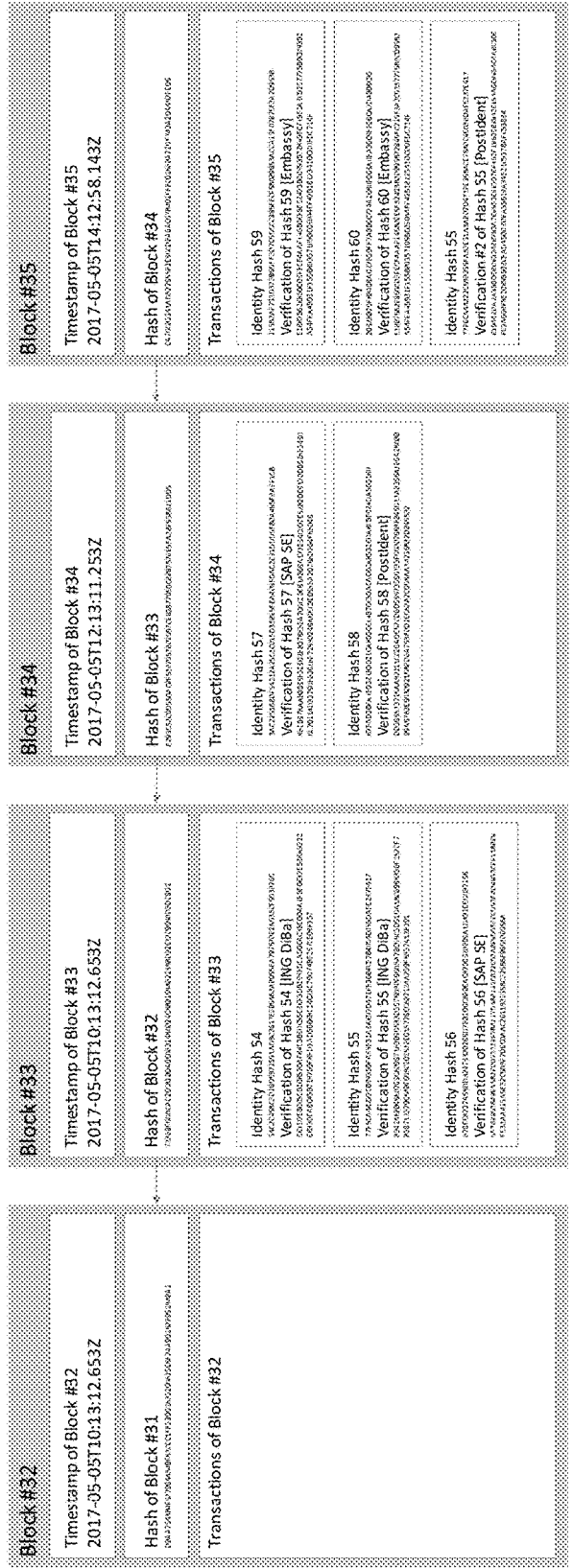
FIG. 5 is a first diagram illustrating a decentralized ledger/blockchain.

FIG. 5 is a first diagram 500 illustrating a decentralized ledger/blockchain. In this arrangement, hashes can be saved by their verifiers such that is no hash in the blockchain (i.e., the decentralized ledger, etc.) which is not verified. The identity hash can be a hash of one attribute or role of an identity, consisting of: 1) publickey, 2) name of the attribute/role, 3) value of the attribute/role, 4) signature of publickey+name+value. The verification of the hash can be a verification of a specific identity hash, consisting of: 1) the identity hash, 2) the signature of the identity hash, signed with the private key of the verifier, 3) the public key of the verifier, 4) (optional) more information about the verifier, e.g. homepage.

Figure 6:
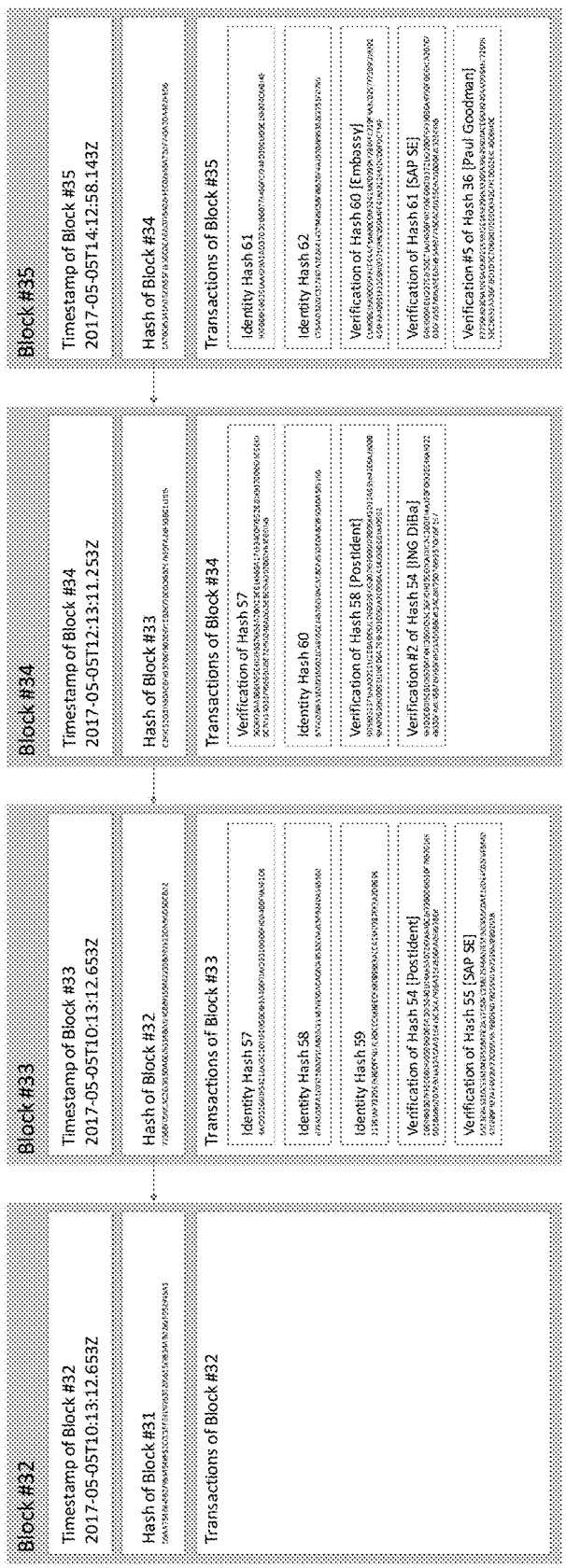
FIG. 6 is a second diagram illustrating the decentralized ledger/blockchain.

FIG. 6 is a second diagram 600 illustrating the decentralized ledger/blockchain in which hashes are saved into the blockchain, the verifications of the hashes come in late. A hash with 0 verifications is not verified. The identity hash in this case is a hash of one attribute or role of an identity comprising: 1) public key, 2) name of the attribute/role, 3) value of the attribute/role, 4) signature of publickey+name+value. the verification of the hash can be verification of a specific identity hash comprising 1) the identity hash, 2) the signature of the identity hash, signed with the private key of the verifier, 3) the public key of the verifier, 4) (optional) more information about the verifier, e.g. homepage.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, solid-state storage devices, memory, and Programmable Logic Devices (PLDs), used to provide machine instructions and/or data to a programmable data processor, including a machine-readable medium that receives machine instructions as a computer-readable signal. The term "computer-readable signal" refers to any signal used to provide machine instructions and/or data to a programmable data processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 7:
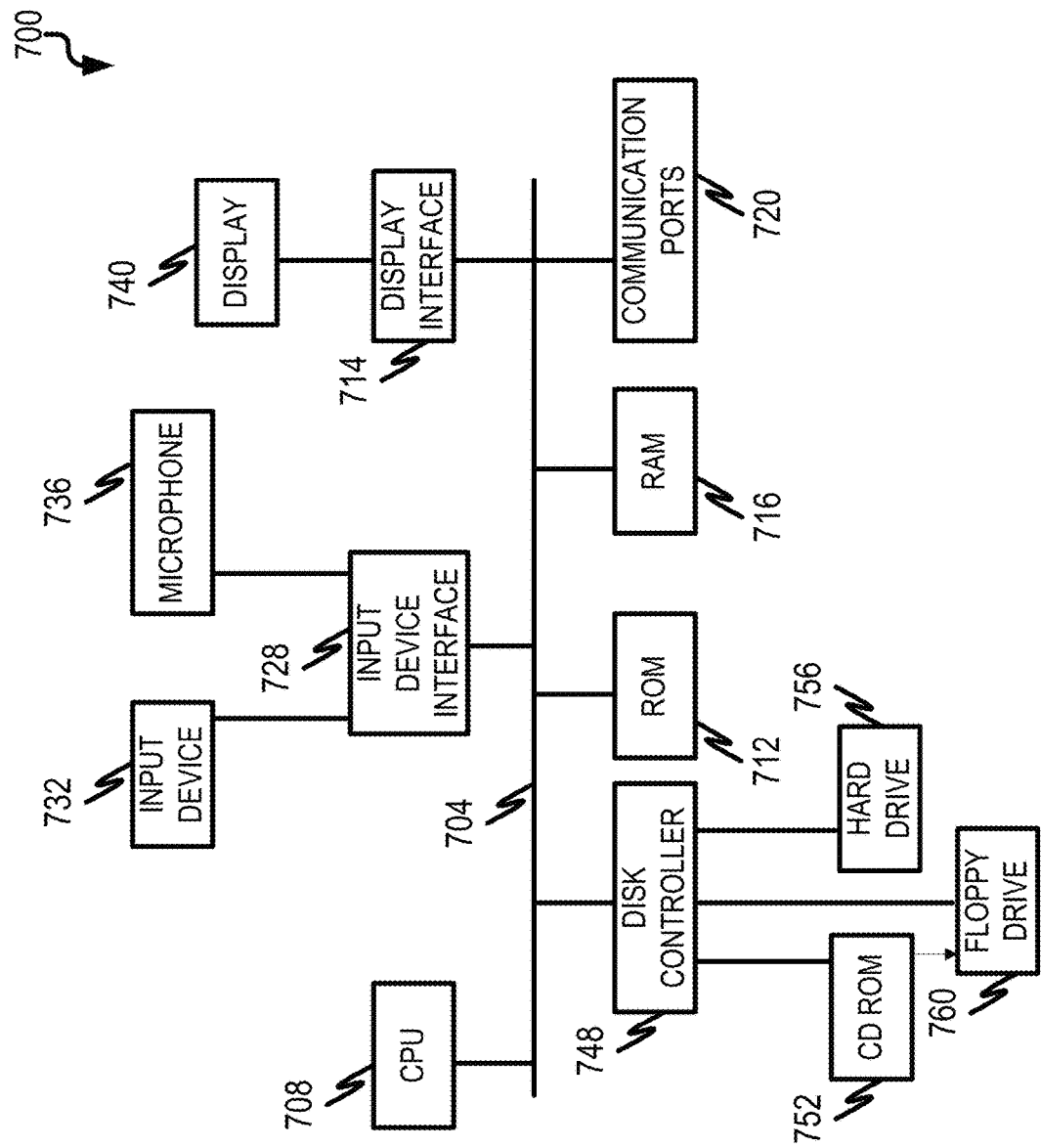
FIG. 7 is a system diagram illustrating an example computing device for implementing aspects described herein.

FIG. 7 is a diagram 700 illustrating a sample computing device architecture for implementing various aspects described herein. A bus 704 can serve as the information highway interconnecting the other illustrated components of the hardware. A processing system 708 labeled CPU (central processing unit) (e.g., one or more computer processors/data processors at a given computer or at multiple computers), can perform calculations and logic operations required to execute a program. A non-transitory processor-readable storage medium, such as read only memory (ROM) 712 and random access memory (RAM) 716, can be in communication with the processing system 708 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 748 can interface one or more optional disk drives to the system bus 704. These disk drives can be external or internal floppy disk drives such as 760, external or internal CD-ROM, CD-R, CD-RW or DVD, or solid state drives such as 752, or external or internal hard drives 756. As indicated previously, these various disk drives 752, 756, 760 and disk controllers are optional devices. The system bus 704 can also include at least one communication port 720 to allow for communication with external devices either physically connected to the computing system or available externally through a wired or wireless network. In some cases, the communication port 720 includes or otherwise comprises a network interface.

To provide for interaction with a user, the subject matter described herein can be implemented on a computing device having a display device 740 (e.g., a CRT (cathode ray tube) or LCD (liquid crystal display) monitor) for displaying information obtained from the bus 704 to the user and an input device 732 such as keyboard and/or a pointing device (e.g., a mouse or a trackball) and/or a touchscreen by which the user can provide input to the computer. Other kinds of input devices 732 can be used to provide for interaction with a user as well; for example, feedback provided to the user can be any form of sensory feedback (e.g., visual feedback, auditory feedback by way of a microphone 736, or tactile feedback); and input from the user can be received in any form, including acoustic, speech, or tactile input. In the input device 732 and the microphone 736 can be coupled to and convey information via the bus 704 by way of an input device interface 728. Other computing devices, such as dedicated servers, can omit one or more of the display 740 and display interface 724, the input device 732, the microphone 736, and input device interface 728.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter.

Although a few variations have been described in detail above, other modifications or additions are possible. For example, the current subject matter is applicable to the storage or other access of data via a cloud-based data storage service. The current subject matter is also applicable to the consumption of utilities such as electricity (e.g., use of an electric vehicle charging station by a subscription holder, etc.). In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer implemented method comprising:
receiving, by an identity verification application, data encapsulating a request to verify an identity of a user, the request including user-provided identification data;
hashing, by the identity verification application, the user-provided identification data;
traversing, by the identity verification application, a decentralized ledger including a data structure comprising a plurality of linked segments to identify a match of the hash of the user-provided identification data; and providing, by the identity verification application, verification data either (i) confirming the identity of the user if the hash of the user-provided identification data has a match in the decentralized ledger, or (ii) rejecting the identity of the user if the hash of the user-provided identification data does not have a match in the decentralized ledger;

wherein:

hashes forming part of the decentralized ledger that have been verified by one of a plurality of verifiers have, within a same segment of the decentralized ledger, an associated verification of hash comprises the corresponding hash, a signature of the corresponding hash signed with a private key of the verifier, and a public key of such verifier; and hashes forming part of the decentralized ledger not having an associated verification of hash indicate that the identity of the corresponding user has not been verified.

2. The method of claim 1, wherein each segment comprises an acknowledgement of such hash of identification information and further comprising:

determining whether the corresponding acknowledgement is from a pre-approved entity.

3. The method of claim 2, wherein the acknowledgement of the hash comprises a cryptographic signing of the hash in the segment.

4. The method of claim 1, wherein the hash of identification information comprises a hash of concatenated user information.

5. The method of claim 1, wherein the hash of identification information comprises a concatenation of multiple hashes of user information.

6. The method of claim 1, wherein the hash of identification information is generated by the user signing a hash of user information using a private key; and wherein the method further comprises:

causing the user-provided information to be signed by the private key.

7. The method of claim 1, wherein the providing of verification data comprises at least one of: displaying at least a portion of the verification data, transmitting at least a portion of the verification data, storing at least a portion of the verification data into electronic physical persistence, or loading at least a portion of the verification data into memory.

8. A system comprising:

at least one data processor; and memory storing instructions which, when executed by the at least one data processor, result in operations comprising:

receiving data encapsulating a request to verify an identity of a user, the request including user-provided identification data;

hashing the user-provided identification data;

traversing a decentralized ledger including a data structure comprising a plurality of linked segments to identify a match of the hash of the user-provided identification data; and providing verification data either (i) confirming the identity of the user if the hash of the user-provided identification data has a match in the decentralized ledger, or (ii) rejecting the identity of the user if the hash of the user-provided identification data does not have a match in the decentralized ledger;

wherein:

hashes forming part of the decentralized ledger that have been verified by one of a plurality of verifiers have, within a same segment of the decentralized ledger, an associated verification of hash comprises the corresponding hash, a signature of the corresponding hash signed with a private key of the verifier, and a public key of such verifier; and hashes forming part of the decentralized ledger not having an associated verification of hash indicate that the identity of the corresponding user has not been verified.

9. The system of claim 8, wherein each segment comprises an acknowledgement of such hash of identification information and wherein the operations further comprise:

determining whether the corresponding acknowledgement is from a pre-approved entity.

10. The system of claim 9, wherein the acknowledgement of the hash comprises a cryptographic signing of the hash in the segment.

11. The system of claim 8, wherein the hash of identification information comprises a hash of concatenated user information.

12. The system of claim 8, wherein the hash of identification information comprises a concatenation of multiple hashes of user information.

13. The system of claim 8, wherein the hash of identification information is generated by the user signing a hash of user information using a private key; and wherein the method further comprises:

causing the user-provided information to be signed by the private key.

14. The system of claim 8, wherein the providing of verification data comprises at least one of: displaying at least a portion of the verification data, transmitting at least a portion of the verification data, storing at least a portion of the verification data into electronic physical persistence, or loading at least a portion of the verification data into memory.

15. A non-transitory computer program product storing instructions which, when executed by at least one data processor forming part of at least one computing device, result in operations comprising:

receiving data encapsulating a request to verify an identity of a user, the request including user-provided identification data;

hashing the user-provided identification data;

traversing a decentralized ledger including a data structure comprising a plurality of linked segments to identify a match of the hash of the user-provided identification data; and providing verification data either (i) confirming the identity of the user if the hash of the user-provided identification data has a match in the decentralized ledger, or (ii) rejecting the identity of the user if the hash of the user-provided identification data does not have a match in the decentralized ledger;

wherein:

hashes forming part of the decentralized ledger that have been verified by one of a plurality of verifiers have, within a same segment of the decentralized ledger, an associated verification of hash comprises the corresponding hash, a signature of the corresponding hash signed with a private key of the verifier, and a public key of such verifier; and hashes forming part of the decentralized ledger not having an associated verification of hash indicate that the identity of the corresponding user has not been verified.

16. The computer program product of claim 15, wherein each segment comprises an acknowledgement of such hash of identification information and wherein the operations further comprise:
   determining whether the corresponding acknowledgement is from a pre-approved entity.

17. The computer program product of claim 16, wherein the acknowledgement of the hash comprises a cryptographic signing of the hash in the segment.

18. The computer program product of claim 15, wherein the hash of identification information comprises a hash of concatenated user information.

19. The computer program product of claim 15, wherein the hash of identification information comprises a concatenation of multiple hashes of user information.

20. The computer program product of claim 15, wherein the hash of identification information is generated by the user signing a hash of user information using a private key; and wherein the method further comprises:
   causing the user-provided information to be signed by the private key.

* * * * *